United States Patent
Cohn et al.

(10) Patent No.: US 9,735,864 B2
(45) Date of Patent: Aug. 15, 2017

(54) METHOD FOR SUPPORTING SNCP OVER PACKET NETWORK

(71) Applicant: Orckit-Corrigent, Tel Aviv (IL)

(72) Inventors: Daniel Cohn, Raanana (IL); Rafi Ram, Herzliya (IL)

(73) Assignee: ORCKIT IP, LLC, Dover, DE (US)

( * ) Notice: Subject to any disclaimer, the term of this patent is extended or adjusted under 35 U.S.C. 154(b) by 0 days.

(21) Appl. No.: 14/878,405

(22) Filed: Oct. 8, 2015

(65) Prior Publication Data

US 2016/0094289 A1   Mar. 31, 2016

Related U.S. Application Data

(62) Division of application No. 13/087,438, filed on Apr. 15, 2011, now Pat. No. 9,160,446.

(51) Int. Cl.
| | |
|---|---|
| *H04B 10/032* | (2013.01) |
| *H04Q 11/00* | (2006.01) |
| *H04L 12/721* | (2013.01) |
| *H04L 12/703* | (2013.01) |
| *H04L 12/939* | (2013.01) |

(52) U.S. Cl.
CPC .......... *H04B 10/032* (2013.01); *H04L 45/28* (2013.01); *H04L 45/68* (2013.01); *H04L 49/557* (2013.01); *H04Q 11/0066* (2013.01); *H04Q 2011/0081* (2013.01)

(58) Field of Classification Search
CPC ........ H04L 45/28; H04L 45/68; H04L 49/557
See application file for complete search history.

(56) References Cited

U.S. PATENT DOCUMENTS

| | | | |
|---|---|---|---|
| 6,370,110 | B1 | 4/2002 | Eslambolchi |
| 7,167,483 | B1 * | 1/2007 | Sharma ..................... H04J 3/14 |
| | | | 370/442 |
| 7,370,107 | B2 | 5/2008 | Mascolo |
| 7,580,417 | B2 | 8/2009 | Ervin et al. |
| 7,583,664 | B2 | 9/2009 | Ho et al. |
| 7,715,322 | B2 | 5/2010 | Gopalakrishna et al. |
| 7,746,767 | B2 | 6/2010 | Allasia et al. |
| 7,801,049 | B2 | 9/2010 | He |
| 8,078,756 | B2 | 12/2011 | Katukam et al. |
| 8,203,931 | B2 | 6/2012 | Caviglia et al. |
| 8,886,832 | B2 | 11/2014 | Caviglia et al. |
| 9,143,227 | B2 | 9/2015 | Moynihan et al. |
| 2003/0041208 | A1 | 2/2003 | Volkmar |

(Continued)

OTHER PUBLICATIONS

J. Bound, et al.; IPv6 Enterprise Network Analysis—IP Layer 3 Focus; copyright the IETF Trust; Apr. 2007.

(Continued)

*Primary Examiner* — Gbemileke J Onamuti
(74) *Attorney, Agent, or Firm* — May Patents Ltd. c/o Dorit Shem-Tov

(57) ABSTRACT

A method is presented for supporting SNCP over a packet network connecting to two SDH sub-networks and transporting one or more SDH paths that are SNCP-protected in both SDH sub-networks. The packet network connects to each of two sub-network interconnection points by a working path and a protection path. The packet sub-network may provide the same type of path protection as an SDH sub-network using SNCP, while avoiding bandwidth duplication.

18 Claims, 16 Drawing Sheets

(56) References Cited

U.S. PATENT DOCUMENTS

| | | | |
|---|---|---|---|
| 2006/0133285 A1 | 6/2006 | Tantsis et al. | |
| 2006/0153179 A1 | 7/2006 | Ho | |
| 2006/0221811 A1 | 10/2006 | Allasia et al. | |
| 2007/0159961 A1 | 7/2007 | Zhai | |
| 2010/0104282 A1 | 4/2010 | Khan et al. | |
| 2011/0194404 A1 | 8/2011 | Kluger et al. | |
| 2012/0287818 A1* | 11/2012 | Corti | H04L 45/04 370/254 |

OTHER PUBLICATIONS

"Generic Protection Switching—Linear Trail and Subnetwork Protection; G.808.1"; ITU-T Standard in Force (1), International Telecommunication Union, Geneva, CH, No. G.808.1 (Mar. 2006), Mar. 29, 2006, XP017404637.

Bryant, S. et al.; MPLS-TP Linear Protection; Draft-Weingarten-MPLS-TP-Linear-Protection-02.TXT, Internet Engineering Task Force, IETF; Stanrdardworkingdraft, Internet Society (ISOC) 4, Rue des Falaises CH-12105, Geneva, Switzerland, No. 3, Jul. 26, 2009 XP015063648.

International Search Report and Written Opinion for PCT Application No. PCT/IB2012/000853, dated Oct. 18, 2012, 10 pages.

* cited by examiner

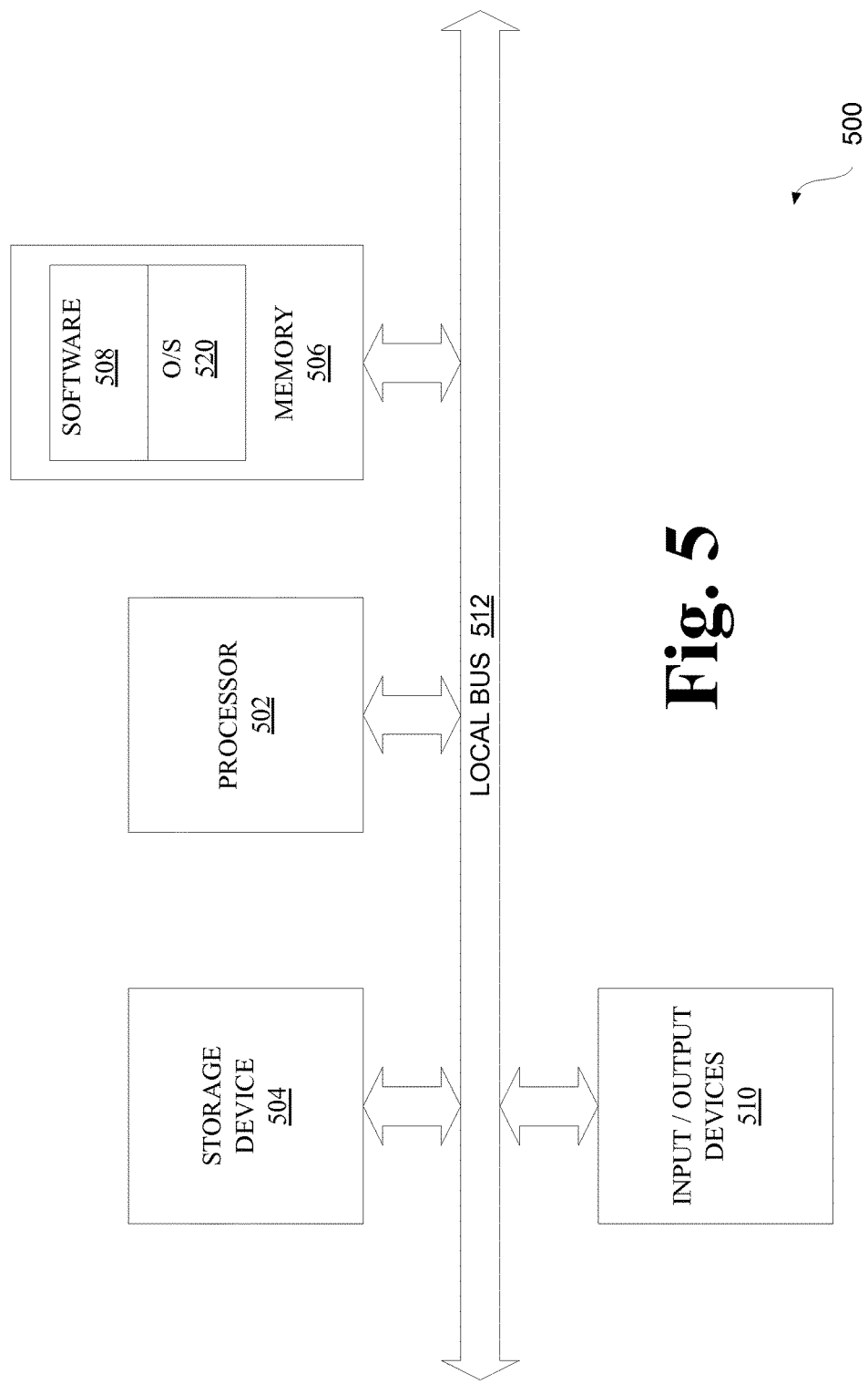

METHOD FOR SUPPORTING SNCP OVER PACKET NETWORK

RELATED APPLICATION

This application is a Divisional of U.S. application Ser. No. 13/087,438, filed Apr. 15, 2011 and is hereby incorporated herein by reference.

FIELD OF THE INVENTION

The present invention relates to telecommunications, and more particularly, is related to high availability telecommunication networks.

BACKGROUND OF THE INVENTION

Traditional analog voice telecommunication was carried over dedicated circuits, so that each connection used the full bandwidth of a circuit. With the advent of digital telecommunications, data and voice messages became packetized, so that a physical circuit may carry multiple virtual circuits. While this provided the advantages of greater efficiency in terms of more usage of each physical circuit, the tradeoff was occasional quality issues, such as latency if a particular circuit was over utilized.

Synchronous Digital Hierarchy (SDH) and synchronous optical network (SONET) were originally developed to transport voice and data over dedicated fiber optic cables. Several methods exist for transmitting SDH/SONET signals over packet networks using pseudo wires (PW), such as Circuit Emulation over Packet (CEP) as defined in RFC 4852.

Among the many protection mechanisms in available SDH and SONET technologies, Sub-network Connection Protocol (SNCP) and Unidirectional Path Switched Ring (UPSR) can be used to provide path protection. In these protection schemes, a SNCP termination equipment (STE) transmits two copies (working and protection) of the protected path over typically disjoint routes, while the STE at the receiving end switches from the working to the protection path when the working path fails or its performance falls below the required level.

SNCP provides protection in the sub-network level, so when a path route includes multiple sub-networks, failures in an individual sub-network are locally repaired and do not affect protection offered at the other sub-networks. A typical example of sub-networks is the SDH ring. UPSR is defined for a ring topology only, and the same principle applies with rings instead of sub-networks.

To provide protection against a node failure, sub-network interconnection can take place across two different nodes. In this case, the connection at one location is connected to the network using two network connections, for example, an add-drop multiplexer. The first node may be active, while the second node may be standby. If the active node fails, for example due to a hardware failure, the standby node becomes active, minimizing the loss of network connection time. This is known as dual node interconnection (DNI) or dual homing.

Using DNI in SNCP applications may cause additional complexity in the protection scheme, as SNCP and UPSR provide protection against a single failure in each sub-network, and DNI also protects against interconnecting failures. By repairing failures in the sub-network level, a failure in one sub-network may not be contained within the sub-network, thus impacting protection in other sub-networks.

FIG. 1 is a schematic diagram of a prior art first network 100 having four nodes 110, including a first node 110A, a second node 110B, a third node 110C and a fourth node 110D. Each node 110 may be, but is not limited to, for example, path termination equipment (PTE). The nodes 110 are configured such that the first node 110A and the second node 110B form a DNI setup on a local side of an MPLS sub-network 150, and the third node 110C and the fourth node 110D form a DNI setup on the remote side of the MPLS sub-network 150. The first node 110A and the third node 110C are connected by working connection PW-13, and the second node 110B and the fourth node 110D are connected by protection connection PW-24. A failure in, for example PW-13 will not be contained to the MPLS sub-network, since the signal received by the first node 110A will not be transmitted by the third node 110C, so a failure in the working PW in a SDH sub-network connected to the third node 110C and the fourth node 110D would result in a complete failure in the protected PW. In this case, a failure in the MPLS sub-network affects the level of protection in the interconnected SDH sub-network, such that the protection scheme does not protect against a single failure in each sub-network. Therefore, there is an unmet need to implement SNCP/UPSR over packet switched networks using DNI, as well as single node interconnections.

SUMMARY OF THE INVENTION

Embodiments of the present invention provide a method for supporting SNCP over a packet network. Briefly described, the present invention is directed to a network having a packet switched sub-network configured to provide pseudo wire transport, a first sub-network connected to the packet switched sub-network, and a second sub-network connected to the packet switched sub-network. The first sub-network protocol and the second sub-network protocol are selected from a group consisting of SDH and SONET. The first sub-network and the second sub-network provide PW protection services selected from a group consisting of SNCP and UPSR. The network is configured to carry data plane traffic over the packet-switched sub-network concurrently by no more than one pseudo wire between the first sub-network and the second sub-network.

A second aspect of the present invention is directed to a method for providing failure protection at the sub-network level in a network having a path traversing a plurality of sub-networks, such that a path failure in an individual sub-network is locally repaired and does not affect protection offered at another sub-network. The method includes the step of providing a network comprising a first sub-network and a second sub-network. The first sub-network and the second sub-network are in communication through a packet switched network, wherein the first sub-network protocol and the second sub-network protocol are selected from a group consisting of SDH and SONET.

The method under the second aspect of the present invention also includes the steps of configuring path protection for the first sub-network from a group consisting of SNCP and UPSR, providing a first STE in the first sub-network, providing a second STE in the first sub-network, and configuring the second STE to terminate a third pseudo wire between the first sub-network and the second sub-network.

Other steps include configuring the second STE to terminate a second pseudo wire between the first sub-network and the second sub-network, configuring the first STE to terminate a first pseudo wire between the first sub-network and the second sub-network, configuring the first STE to terminate a fourth pseudo wire between the first sub-network and the second sub-network, and configuring the first STE to transport over the packet network up to one of the group including the first pseudo wire, and the fourth pseudo wire. Further steps include configuring the second STE to transport over the packet network up to one of the group including the second pseudo wire, and the third pseudo wire, and configuring the first STE and the second STE such that the packet sub-network transports data plane traffic on exactly one PW between the first sub-network and the second sub-network selected from the group of PWs including the first pseudo wire, the second pseudo wire, the third pseudo wire, and the fourth pseudo wire.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 2A illustrates the basic connectivity among four nodes;

FIG. 2B illustrates the working and protection paths of the first sub-network under normal conditions;

FIG. 2C illustrates the working and protection paths upon a failure in the working path connected to the first node;

FIG. 2D illustrates the working and protection paths upon a failure of the first node; and FIG. 2E illustrates the working and protection paths upon a failure of the third node.

FIG. 4A illustrates the path of the first sub-network under normal conditions;

FIG. 4B illustrates the path upon a failure in the working path connected to the first node; and FIG. 4C illustrates the path upon a failure of the first node.

FIG. 5 is a schematic diagram illustrating an example of a system within a node for executing functionality of the present invention.

DETAILED DESCRIPTION

Figure 1:
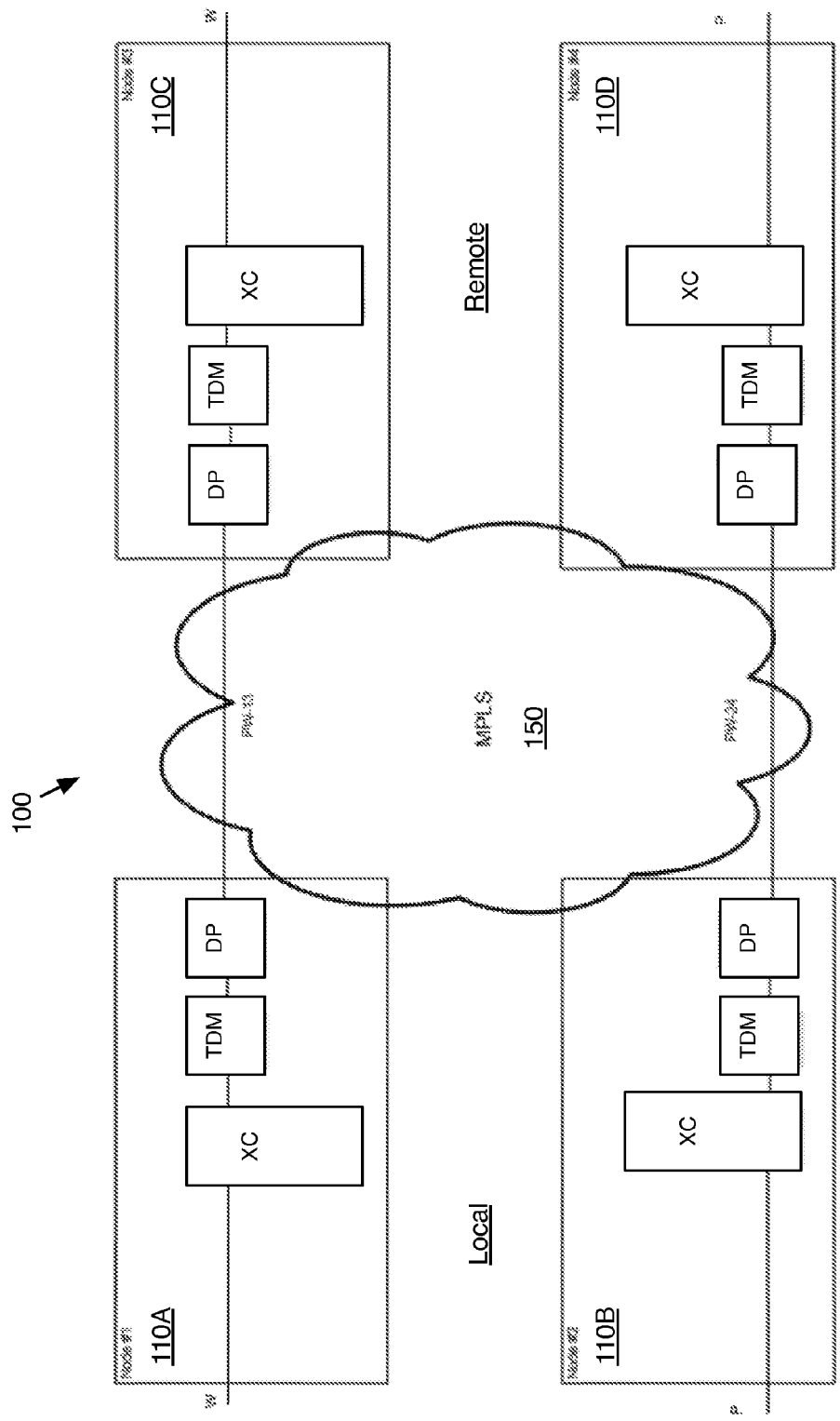
FIG. 1 is a schematic diagram of a prior art first network having four SNCP terminating nodes.

Reference will now be made in detail to embodiments of the present invention, examples of which are illustrated in the accompanying drawings. Wherever possible, the same reference numbers are used in the drawings and the description to refer to the same or like parts.

In what follows, the term SDH will be used to refer to SDH and SONET indistinctly, and SNCP will be used to refer to SNCP and UPSR indistinctly, noting that USPR applies only to rings while SNCP applies to any sub-network topologies. Please note that the protection methods described herein may be configured to revert from the protection path to the working path when the failure condition in the working path is removed. Unless otherwise noted, the application of the current invention applies to both revertive and non-revertive protection implementations.

First Embodiment: 2.times.2 Configuration

Among other possible embodiments, in a first exemplary embodiment of a method of supporting SNCP over packet networks, a packet sub-network is connected to two SDH sub-networks and transports one or more SDH paths that are SNCP-protected in both SDH sub-networks. In this embodiment, the packet sub-network connects to each of the two sub-network interconnection points by a working path and a protection path.

Figure 2A:
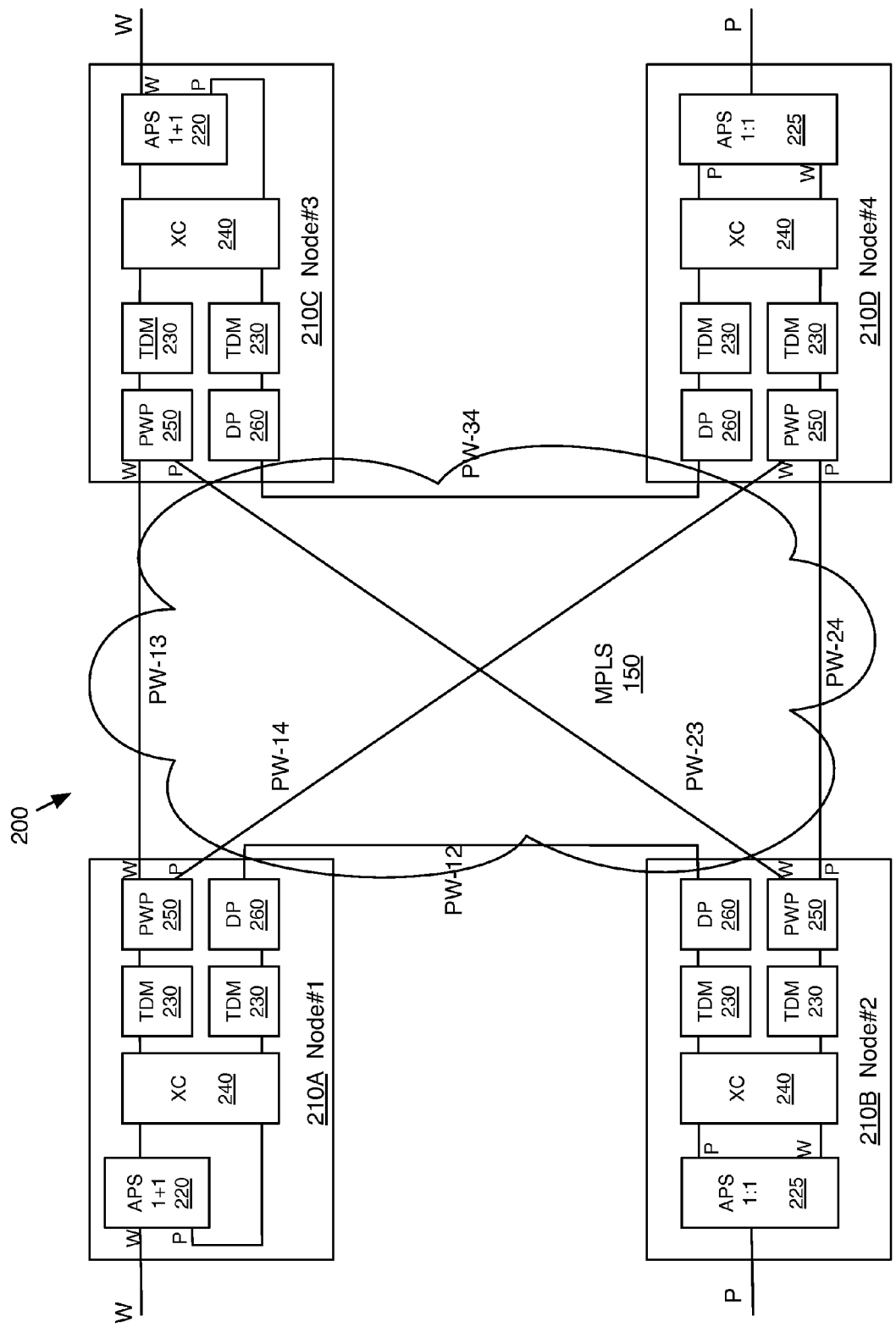
FIGS. 2A-2E are schematic diagrams of a second network having four SNCP terminating nodes.

FIG. 2A is a schematic diagram of a second network 200 having four SNCP terminating nodes 210 including a first node 210A, a second node 210B, a third node 210C and a fourth node 210D. The first node 210A and the second node 210B are part of a first sub-network, and the third node 210C and the fourth node 210D are part of a second sub-network. The nodes 210 may be SNCP terminating equipment (STE), examples of which include, but are not limited to, add/drop multiplexers. The first sub-network and the second sub-network may be, for example, counter rotating rings.

As noted above, the first sub-network and the second sub-network are path protected by SNCP. The first sub-network and the second sub-network provide working and protection paths, implementing dual node interconnection (DNI). The dual nodes for the first sub-network are the first node 210A and the second node 210B. The dual nodes for the second sub-network are the third node 210C and the fourth node 210D. Each of these nodes 210 provides a working PW path and a protection PW path across an MPLS sub-network 150.

Under the first embodiment, the first node 210A terminates a first pseudo wire PW-13 and a fourth pseudo wire PW-14. The second node 210B terminates a second pseudo wire PW-23 and a third pseudo wire PW-24. The third node 210C terminates the first pseudo wire PW-13 and the second pseudo wire PW-23. The fourth node 210D terminates the third pseudo wire PW-24 and the fourth pseudo wire PW-14. It should be noted that the pseudo wire names do not imply an order of fail-over precedence for any particular failure scenario.

The first sub-network and the second sub-network are connected via a packet switched network, in this case the MPLS sub-network 150. The MPLS sub-network 150 may provide pseudo wire transport services as described previously. While this embodiment describes the packet switched sub-network as an MPLS sub-network 150, there is no objection to using other packet switching networking protocols to provide the pseudo wire transport between the first sub-network and the second sub-network. In addition, the first node 210A and the second node 210B may communicate through the MPLS sub-network 150 via a fifth PW-12. Similarly, the third node 210C and the fourth node 210D may communicate through the MPLS sub-network 150 via a sixth PW-34.

It is desirable for the MPLS sub-network 150 to transport, or carry, data plane traffic between the first sub-network and the second sub-network using a single active data plane path to avoid bandwidth duplication. For example, while the first pseudo wire PW-13, the fourth pseudo wire PW-14 the second pseudo wire PW-23, and the third pseudo wire PW-24 may all carry control plane traffic across the MPLS sub-network 150 to exchange lower bandwidth traffic, for example, signals indicating alarms, conditions and protection status, it is desirable for only one of these four paths at a time to carry data plane traffic. The first embodiment provides SNCP protection between the first sub-network and the second sub-network while making more efficient use of MPLS sub-network 150 bandwidth than, for example, the first network 100 (FIG. 1) where the MPLS sub-network 150 carries duplicate data plane traffic between the first sub-network and the second sub-network.

Each node 210 contains internal functional components including two time division multiplexer/demultiplexer (TDM) blocks 230, a data plane module 260, a cross connect (XC) block 240, and an additional data plane processor providing 1:1 pseudo wire protection services (PWP) block 250. The XC block 240 implements a high/low-order SDH path cross-connect. In addition, the first node 210A and the third node 210C include an automatic protection switch (APS) 1+1 220, while the second node 210B and the fourth node 210D include an APS 1:1 block 225. The APS 1+1 block 220 implements APS 1+1 unidirectional-like logic at the SDH path level. The APS 1:1 block 225 implements APS 1:1 unidirectional-like logic at the SDH path level. The TDM blocks 230, among other functions, may implement circuit emulation functions. The internal components may be implemented as individual components, for example, hardware components communicating via hardwired connections. A single hardware component may provide the functionality of one or more of the internal components. As explained in further detail below the internal components may be implemented as software or firmware modules within a computer system internal to the node 210, or may be implemented in a combination of hardware and software.

The DP block 260 implements data plane aspects of PW functionality. The PWP block 250 implements, in addition to the functions provided by the DP block 260, data plane aspects of PW protection functionality. For the purpose of this document, suffice to say that the PWP block 250 switches data plane forwarding to the protection PW (labeled as "P") when the working PW (labeled as "W") is in failure condition. In addition to the data plane services, the PWP block 250 provides path switching services between working and protection paths. These services may include, among others, interpreting conditions to determine whether to select the working path or the protection path for carrying SDH path traffic. For example, a condition may include a packet switched network (PSN) fault or an attachment circuit (AC) fault). PW failure definition and detection mechanisms are known to persons having ordinary skill in the art and are beyond the scope of this document.

The PWP block 250 in each node 210 determines which path (if any) will carry data plane traffic from that node 210 across the MPLS sub-network 150. The PWP block 250 in the first node 210A may select between the first pseudo wire PW-13 and the fourth pseudo wire PW-14. The PWP 250 in the second node 210B may select between second pseudo wire PW-23 and the third pseudo wire PW-24. The PWP block 250 in the third node 210C may select between the first pseudo wire PW-13 and the second pseudo wire PW-23. The PWP block 250 in the fourth node 210D may select between the fourth pseudo wire PW-14 and the third pseudo wire PW-24.

It should be noted that while the network facing ports of the PWP blocks 250 are labeled W (working) and P (protection), they may be connected to ports with contrary names. This is due to the nature of cross connecting nodes in a manner not normally used in SDH networks. For example, the PWP block 250 port W in the fourth node 210D is connected to the PWP block 250 port P in the first node 210A via the fourth pseudo wire PW-14. Similarly, the PWP block 250 port P in the third node 210C is connected to the PWP block 250 port W in the second node 210B via the second pseudo wire PW-23.

Figure 2B:
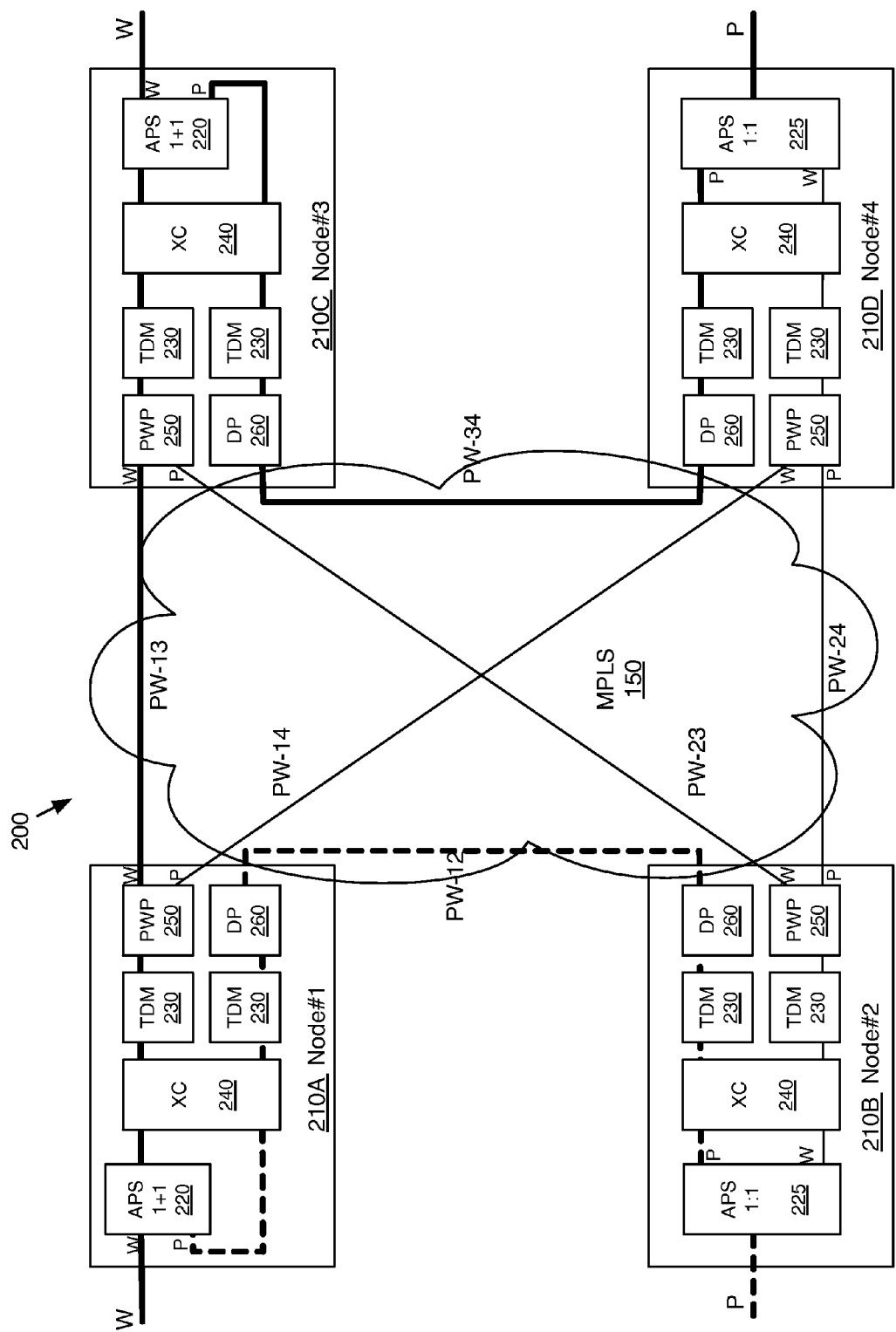

FIG. 2B illustrates the working and protection paths of the first sub-network under normal conditions, when there are no failures in the network 200. In the no failure condition, the SDH working path connected to the first node 210A is carried over the first pseudo wire PW-13 to the third node 210C. This working path is indicated in FIG. 2B by a solid heavy line. In the third node 210C the received path is sent both to the SDH working interface and to the fourth node 210D over the sixth PW-34. The fourth node 210D forwards the path to the SDH protection interface.

The second pseudo wire PW-23 does not carry an SDH path in the right-to-left direction from the third node 210C to the second node 210B since the PWP block 250 in the third node 210C is switched to the working channel. The third pseudo wire PW-24 also does not carry an SDH path since the APS 1:1 block 225 in the fourth node 210D is switched to the working channel. As a result, the working channel in the second node 210B APS 1:1 225 block receives an AIS signal from the TDM block 230, and the APS 1:1 block 225 is switched to the protection channel. The second pseudo wire PW-23 does not carry an SDH path in the left-to-right direction from the second node 210B to the third node 210C since APS 1:1 block 225 is switched to the P port. Therefore, the SDH protecting path connected to the second node 210B is carried to the first node 210A over the fifth PW-12, but the APS 1+1 220 in the first node 210A selects the working path instead (since the working path is in "no defect" state).

Figure 2C:
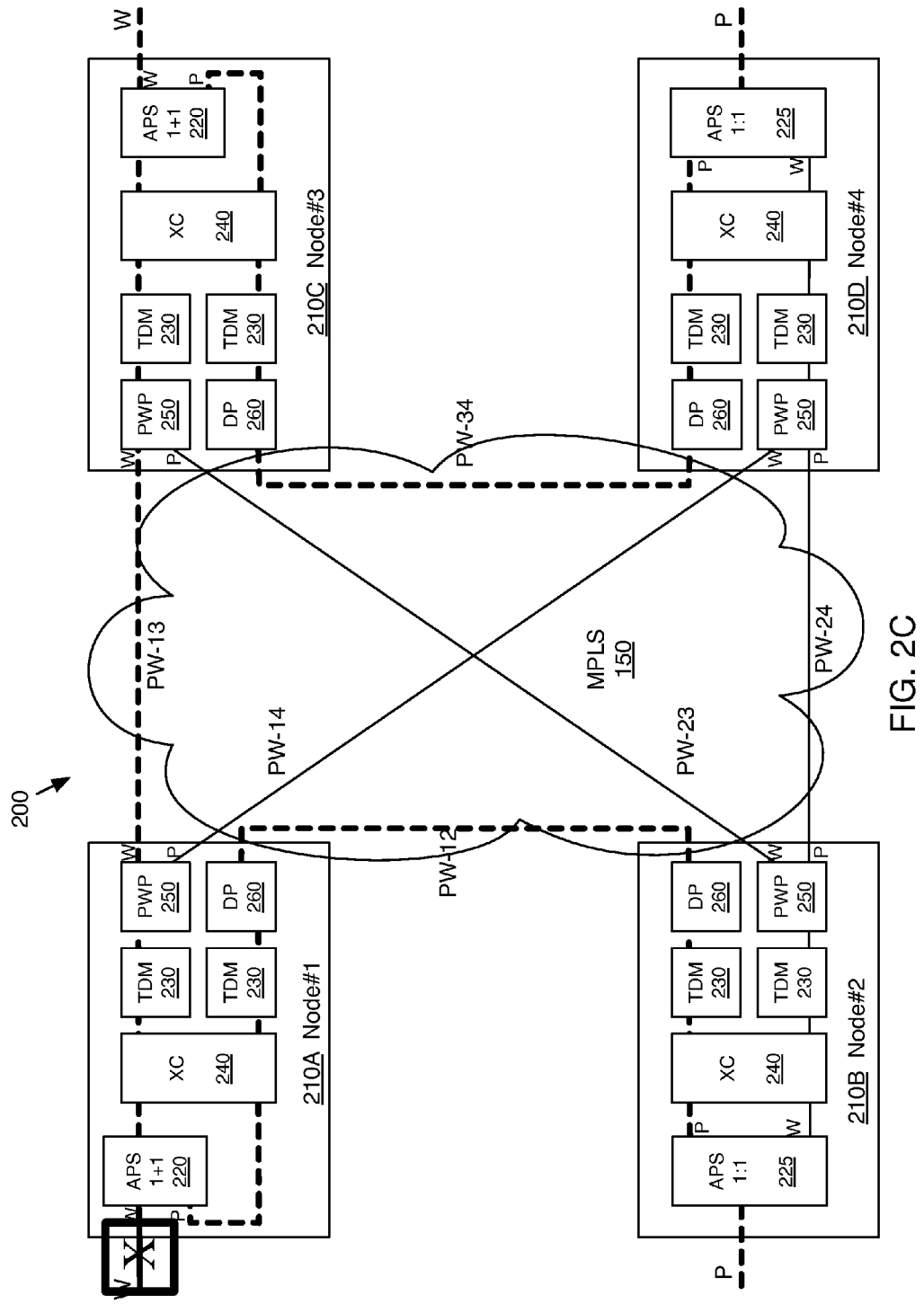

Upon a failure in the working path connected to the first node 210A, as shown by the blocked "X" in FIG. 2C, the APS 1+1 block 220 in the first node 210A switches to the protection channel P, which carries the protection path from the second node 210B, denoted by a heavy dashed line. As a result, the protection path is still carried over the first pseudo wire PW-13 towards the third node 210C. Note that only the first pseudo wire PW-13 is transporting data plane traffic across the MPLS sub-network 150, while the fourth pseudo wire PW-14, the second pseudo wire PW-23, and the third pseudo wire PW-24 are not carrying data plane traffic.

Figure 2D:
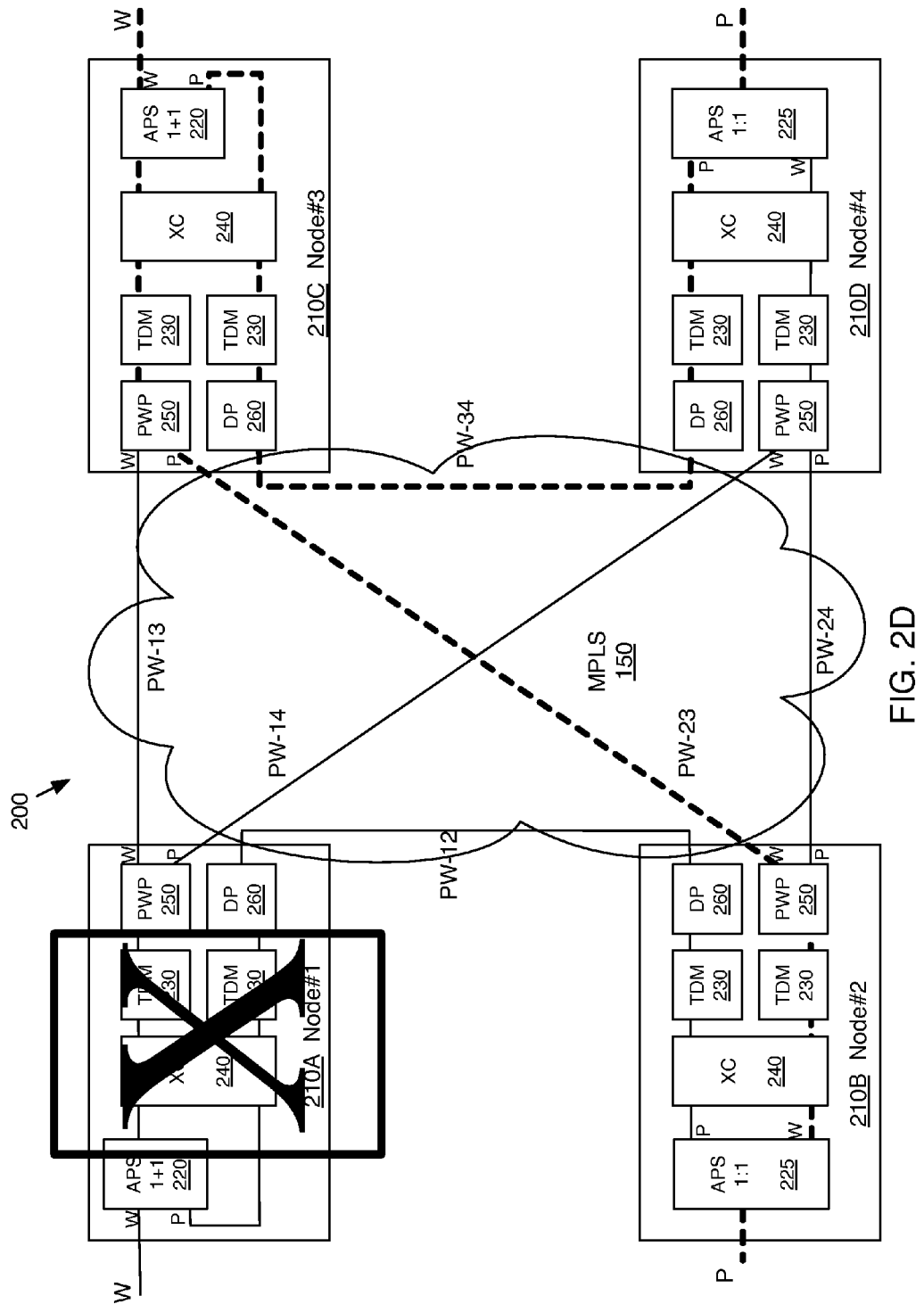

Upon a failure in the first node 210A, as shown in FIG. 2D, the second node 210B will detect LOS or AIS in the output of the TDM block connected to the fifth PW-12, upon which the APS 1:1 block 225 in the second node 210B switches to the working channel, such that the protection path connected to the second node 210B is carried to the third node 210C over the second pseudo wire PW-23, as denoted by the heavy dashed line. The third node 210C PW protection block switches from the first pseudo wire PW-13 to the second pseudo wire PW-23, triggered by failure in the first node 210A. The path received at the third node 210C is transmitted over the SDH interfaces in the third node 210C and the fourth node 210D as in the "no failure" scenario shown in FIG. 2B.

Figure 2E:
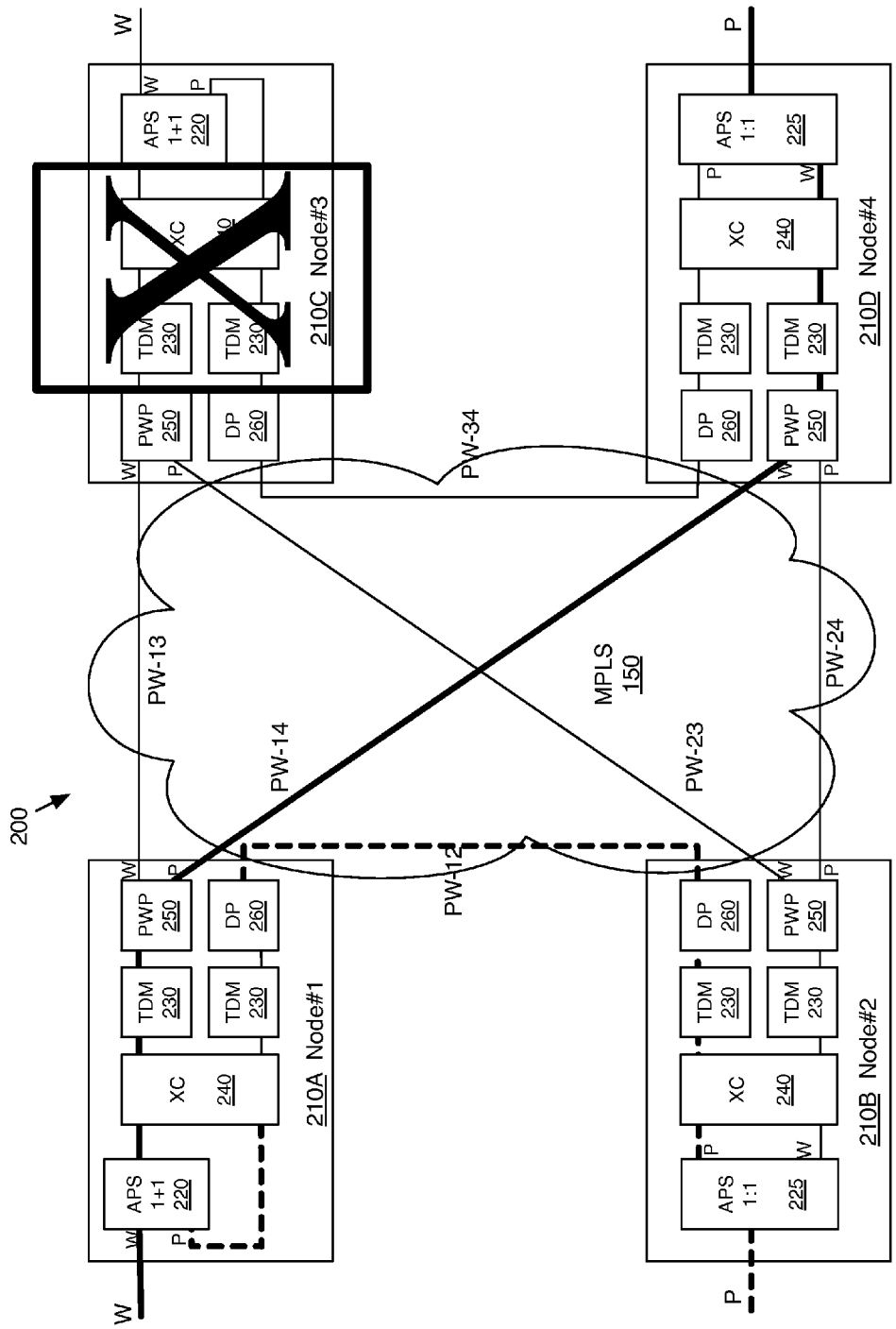

FIG. 2E shows the signal path in the event of a failure of the third node 210C. In this case, the PWP block 250 of the first node 210A detects LOS in the first pseudo wire 13, causing the PWP block 250 of the first node 210A to switch to the protection channel, carried over the fourth pseudo wire PW-14 to the fourth node 210D, as denoted by the heavy solid line. Similarly, the DP 260 in the fourth node 210D detects failure of the third node 210C by LOS over the sixth PW-34, causing the APS 1:1 225 in the fourth node 210D to switch to the working channel.

Of course, additional failure scenarios are possible. For example, failures may occur in pseudo wire paths within the MPLS sub-network 150. As applied to pseudo wire paths within the MPLS sub-network 150, the term "failure" is intended broadly to include not meeting various configurable minimum performance standards. For example, traffic on a working path may be passing, but performance parameters, such as a bit error ratio on the working path may exceed a pre-configured threshold, causing the PWP blocks 250 with the terminating nodes 210 to switch from the working path to a protection path.

Second Embodiment: 2.times.2 Configuration with Single Node SDH

Figure 3:
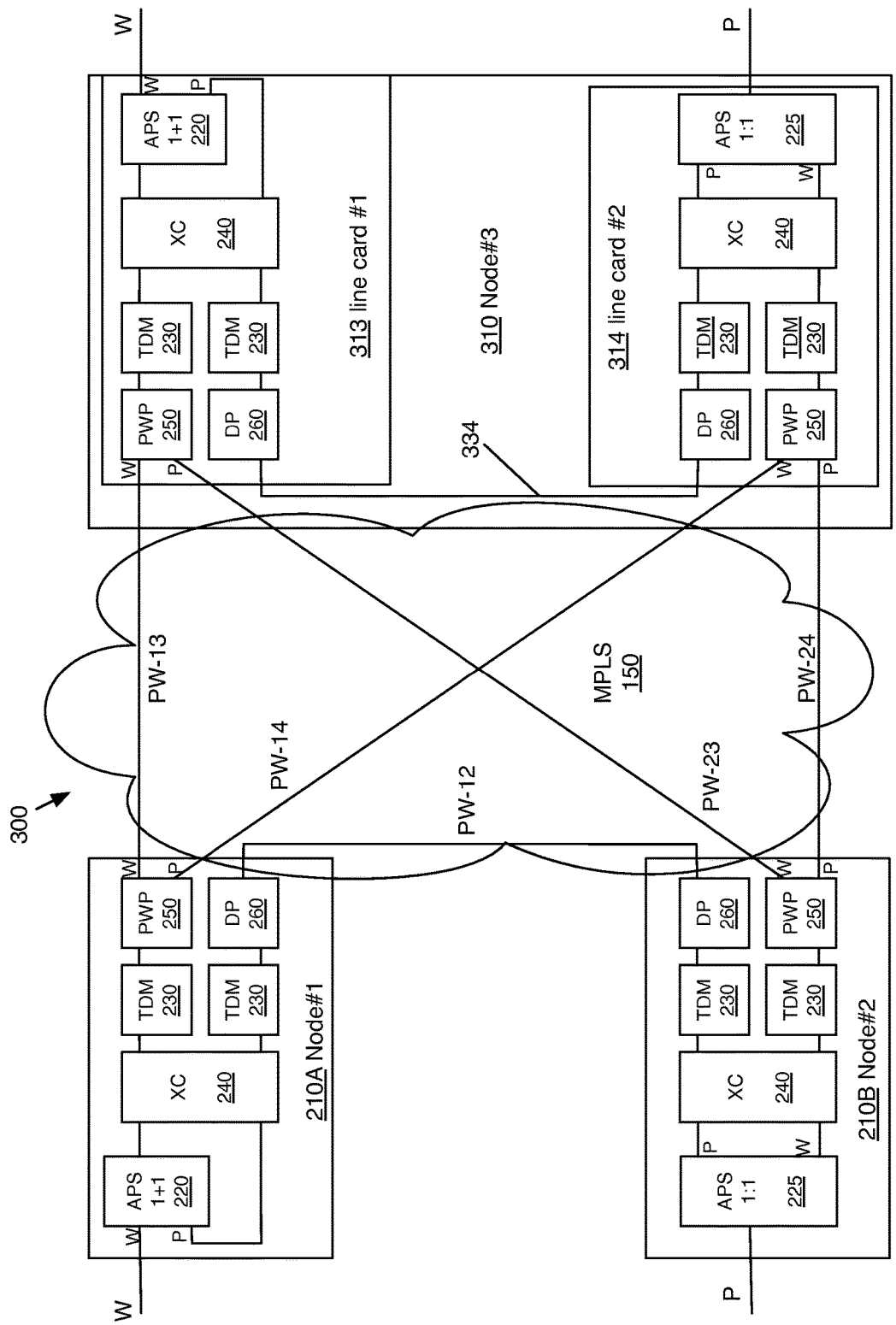
FIG. 3 is a schematic diagram of a third network having three SNCP terminating nodes.

A second exemplary embodiment of a method of supporting SNCP over packet networks is shown in FIG. 3. In general, the second embodiment is similar to the first embodiment, except that according to the second embodiment, the interconnection between the MPLS sub-network 150 with the first SDH sub-network and/or the second SDH sub-network takes place over a single node, as opposed to DNI.

FIG. 3 is a schematic diagram of a third network 300 having three SNCP terminating nodes including a first node 210A, a second node 210B, and a third node 310. The first sub-network deploys a DNI connection with the MPLS sub-network 150. The first node 210A and the second node 210B are part of a first sub-network, and the third node 310 is part of a second sub-network. Unlike the first embodiment, under the second embodiment the second sub-network provides two working/protection connection pairs to the MPLS sub-network at a single node, the third node 310. While FIG. 3 shows the first sub-network having a DNI connection, while the second sub-network terminates dual working/protection pairs within a single node (in this case, the third node 310), there is no objection to a network where the first sub-network terminates dual working/protection pairs within a single node and the second sub-network terminates dual working/protection pairs within a single node. The topology at each sub-network is independent of the topology of the sub-network across the MPLS sub-network.

As shown in FIG. 3, the third node 310 may terminate a first working/protection pair with, for example, a first line card 313, and the third node 310 similarly terminates a second working/protection pair with, for example, a second line card 314.

From the point of view of the MPLS sub-network 150, the second embodiment functions identically to the first embodiment. The first node 210A terminates a first pseudo wire PW-13 and a fourth pseudo wire PW-14. The second node 210B terminates a second pseudo wire PW-23 and a third pseudo wire PW-24. The first line card 313 of the third node 310 terminates the first pseudo wire PW-13 and the second pseudo wire PW-23. The second line card 314 of the third node 310 terminates the third pseudo wire PW-24 and the fourth pseudo wire PW-14. Under the second embodiment, the working/protection paths between the first line card 313 and the second line card 314 is a hairpin path 334. A hairpin path is a path internal to the node. The hairpin path 334 is internal to a single node, in this case the third node 310.

A person having ordinary skill in the art will appreciate that the failure scenario path routing under the second embodiment is parallel to the failure scenario path routing under the first embodiment as described above, with the first line card 313 performing the function of the third node 210C (FIG. 2E), the second line card 314 performing the functions of the fourth node 210D (FIG. 2E), and the hairpin path 334 performing the function of the sixth PW-34 (FIG. 2E).

Third Embodiment: 2.times.1 Configuration

In a third exemplary embodiment of a method of supporting SNCP over packet networks, here called the 2.times.1 scenario, a packet network is connected to two SDH sub-networks and carries an SDH path that is SNCP-protected in only one of the SDH sub-networks. In the third embodiment, the packet node is connected to two paths (working and protection) in one of the sub-network interconnection points, and to a single path in the other. As with the first and second embodiments, the packet sub-network is configured to provide the same type of path protection as an SDH sub-network using SNCP.

Figure 4A:
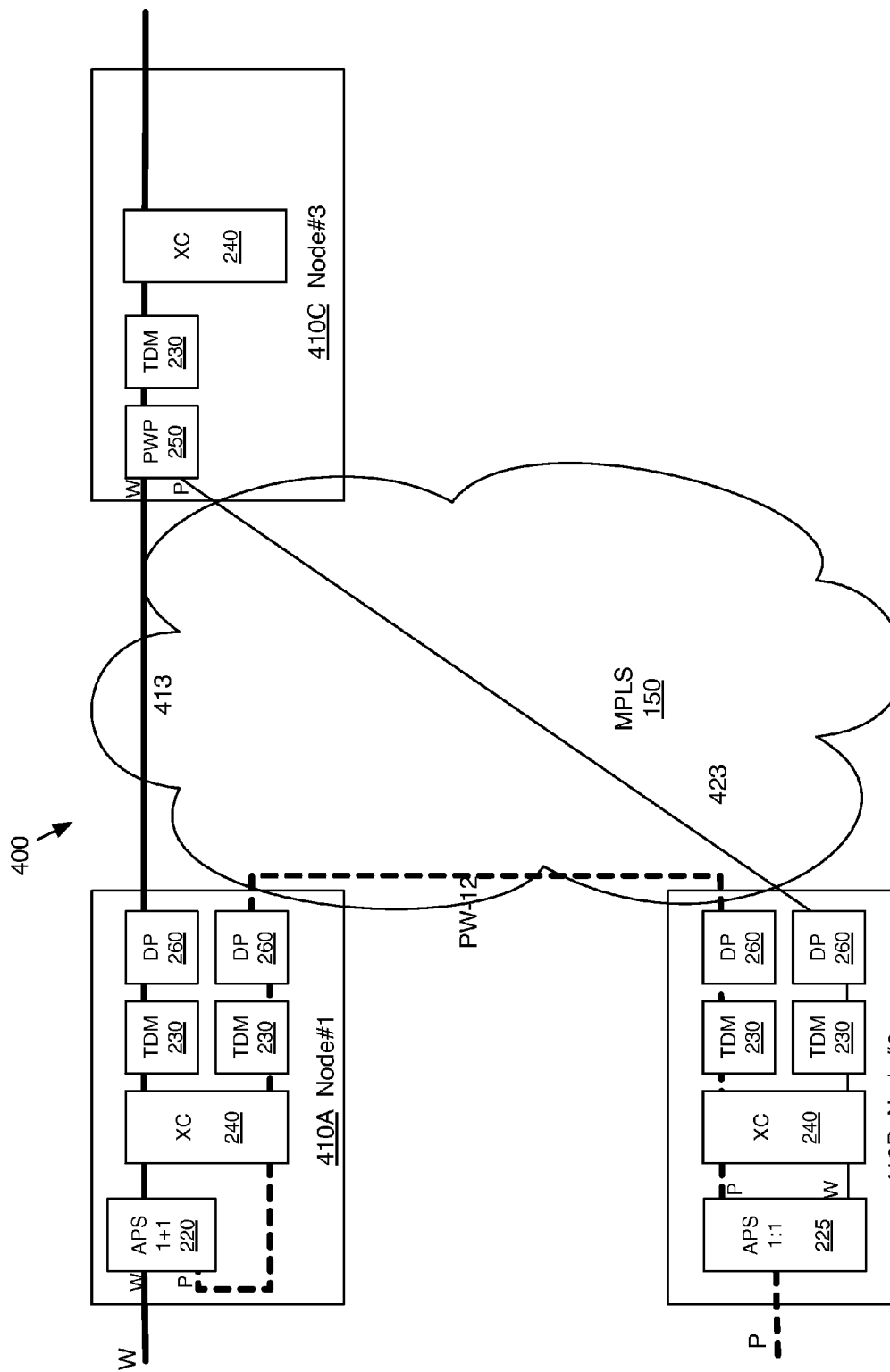
FIGS. 4A-4C are schematic diagrams of a fourth network having three SNCP terminating nodes.

FIG. 4A is a schematic diagram of a fourth network 400 having three SNCP terminating nodes 410 including a first node 410A, a second node 410B, and a third node 410C. The first sub-network deploys a DNI connection with the MPLS sub-network 150. The first node 410A and the second node 410B are part of a first sub-network, and the third node 410C is part of a second sub-network. Unlike the first and second embodiments, under the third embodiment the second sub-network provides a single working/protection connection pair to the MPLS sub-network at a single node, the third node 410C.

As shown in FIG. 4A, the PWP block 250 of the third node 410C may terminate a working path 413 from the first node 410A, and a protection path 423 from the second node 410B. Compared with the first embodiment, PW protection blocks 260 (FIG. 2A) in the first node 410A and the second node 410B become degenerate, becoming DP blocks 250, implementing PW functionality without protection. The third node 410C may omit or bypass an APS 1+1 block (FIG. 2A).

Figure 4B:
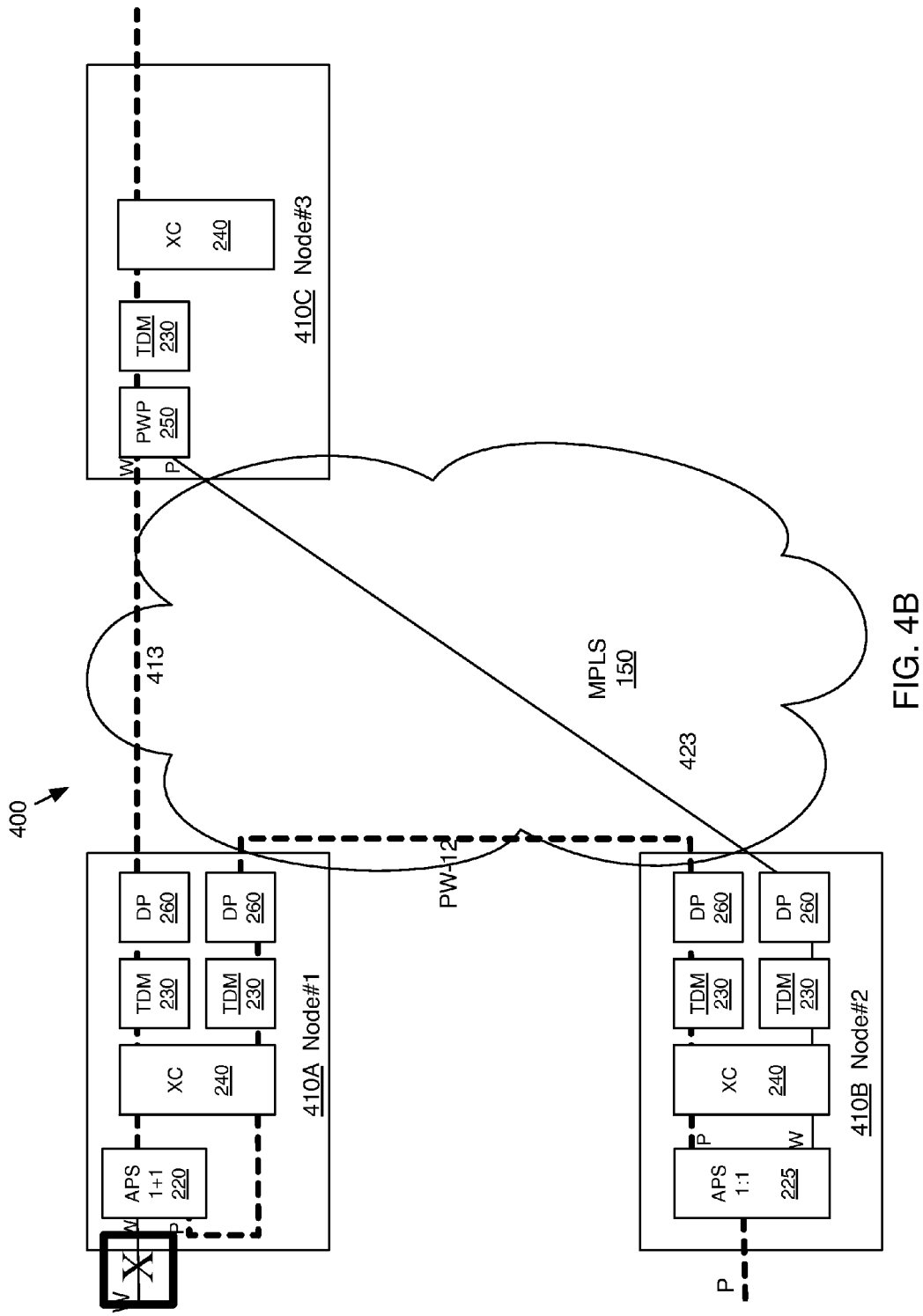
Figure 4C:
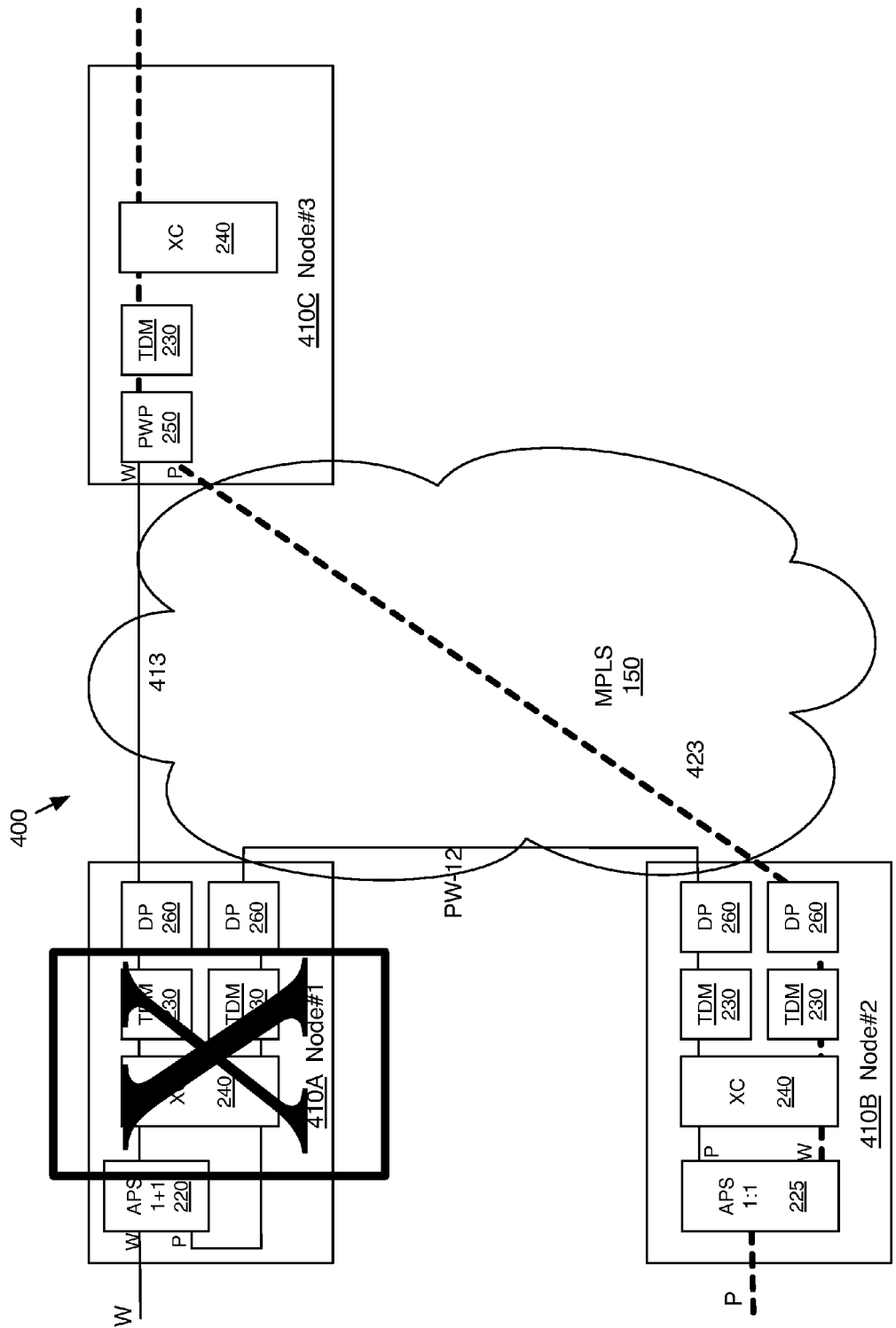

Under normal, non-failure conditions, the first sub-network and the second sub-network communicate between the first node 410A and the third node 410C over the working path 413. As shown in FIG. 4B, if the working connection to the first node 410A fails, the APS 1+1 220 detects LOS and switch to the protection path, routing the traffic across working path 413. If, alternatively, the first node 410A fails, as shown in FIG. 4C, the PWP block 250 in the third node 410C detects LOS or receives AIS on the working path 413, causing the PWP block 250 to switch to the protection path 423. Similarly, the second node 410B detects LOS or receive AIS on fifth PW-12, causing the APS 1:1 225 in the second node 410B to switch to the working path, forwarding data over protection path 423 across the MPLS sub-network 150 to the third node 410C.

Computer System within a Node

As previously mentioned, the functionality of the APS 1+1 220, the APS 1:1 225, the TDM 230, the XC 240, the PWP block 250 and the DP 260 modules within a node 210 (FIGS. 2A-2E, FIG. 3, FIGS. 4A-4C) described in detail above may be a computer system. An example of a computer system is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

Fourth Embodiment: No APS 1:1

Figure 6A:
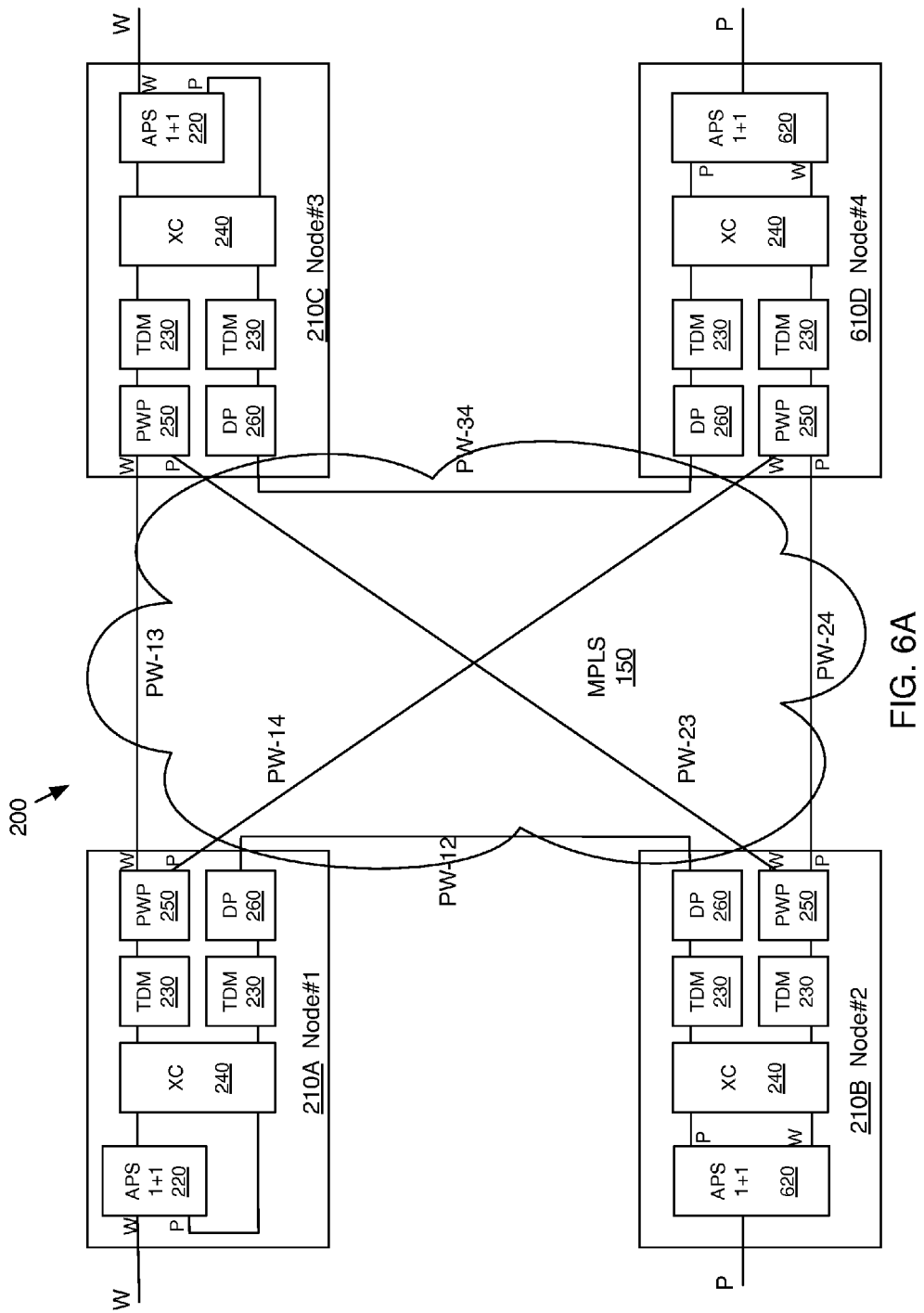
FIG. 6A is a schematic diagram of a fourth exemplary embodiment of a method of supporting SNCP over packet networks.

APS 1:1 logic may involve decisions on one transmission direction based on path conditions in the opposite direction, which requires some degree of coupling between path directions. When such coupling is not present, the APS 1:1 block 225 (FIG. 2A) may not be directly supported in some SDH framer implementations. FIG. 6A is a schematic diagram of a fourth exemplary embodiment of a method for supporting SNCP over packet networks using APS 1+1 blocks 620 in place of APS 1:1 blocks 225 (FIG. 2A).

The fourth embodiment is essentially similar to the second embodiment, except the second node 210B (FIG. 2A) is replaced by a second node 610B, and the fourth node 210D is replaced by a fourth node 610D. Regarding the second node 610B, an APS 1+1 block 620 replaces the APS 1:1 block 225 (FIG. 2A). Similarly, regarding the fourth node 610D, an APS 1+1 block 620 replaces the APS 1:1 block 225 (FIG. 2A). Under the fourth embodiment, the failure scenarios of the second embodiment detailed above apply, with the differences explained hereafter.

Figure 6B:
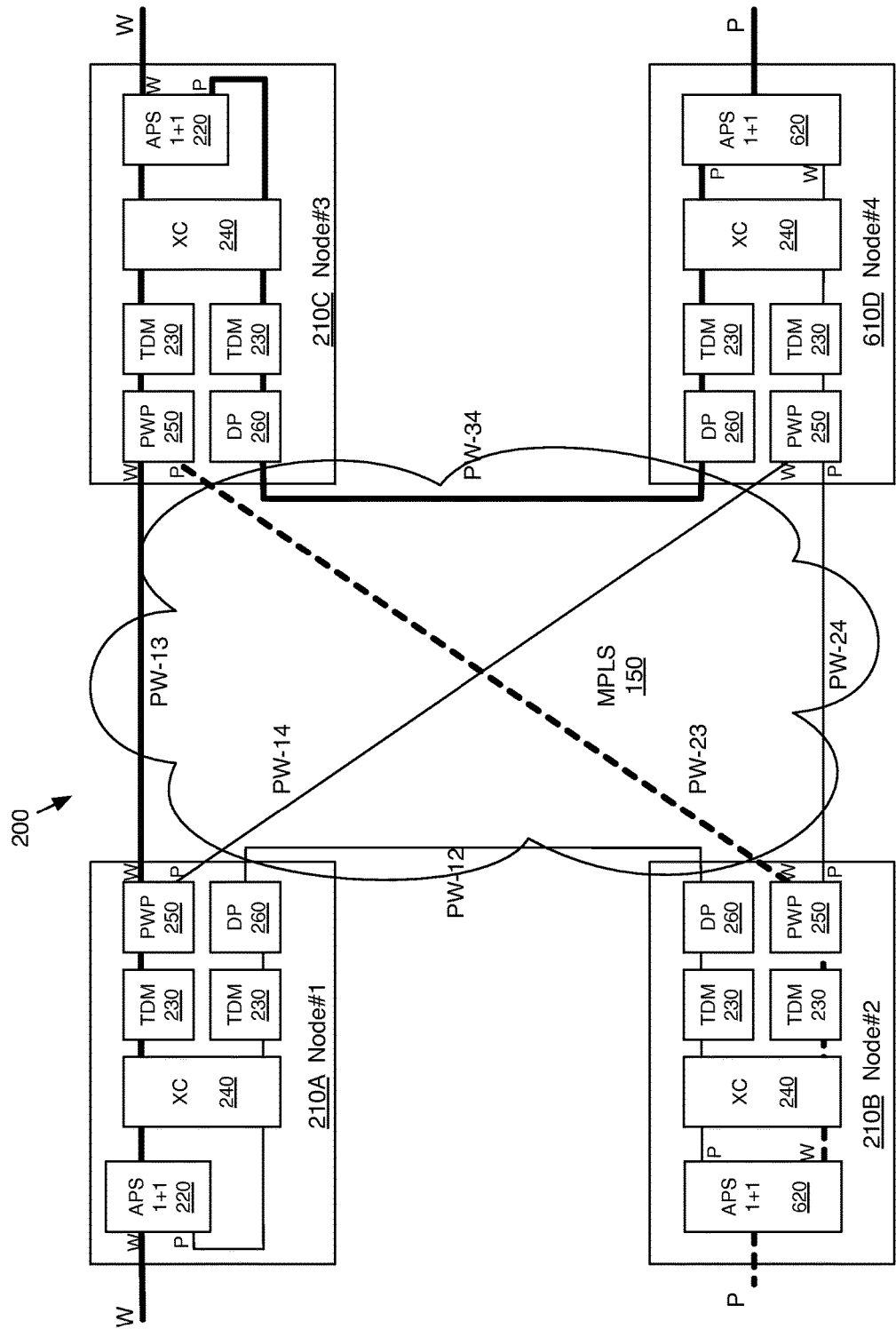
FIG. 6B is a schematic diagram of SDH paths in the fourth exemplary embodiment during a non-failure scenario.

FIG. 6B shows the signal paths in the network 200 where no failures are present. A heavy solid line shows the working path, while a heavy dashed line shows the protection path. The working path is transported from the first node 210A through the MPLS sub-network 150 via the first pseudo wire PW-13 to the third node 210C. The protection path is transported from the second node 610B through the MPLS sub-network 150 via the second pseudo wire PW-23 to the third node 210C.

Figure 6C:
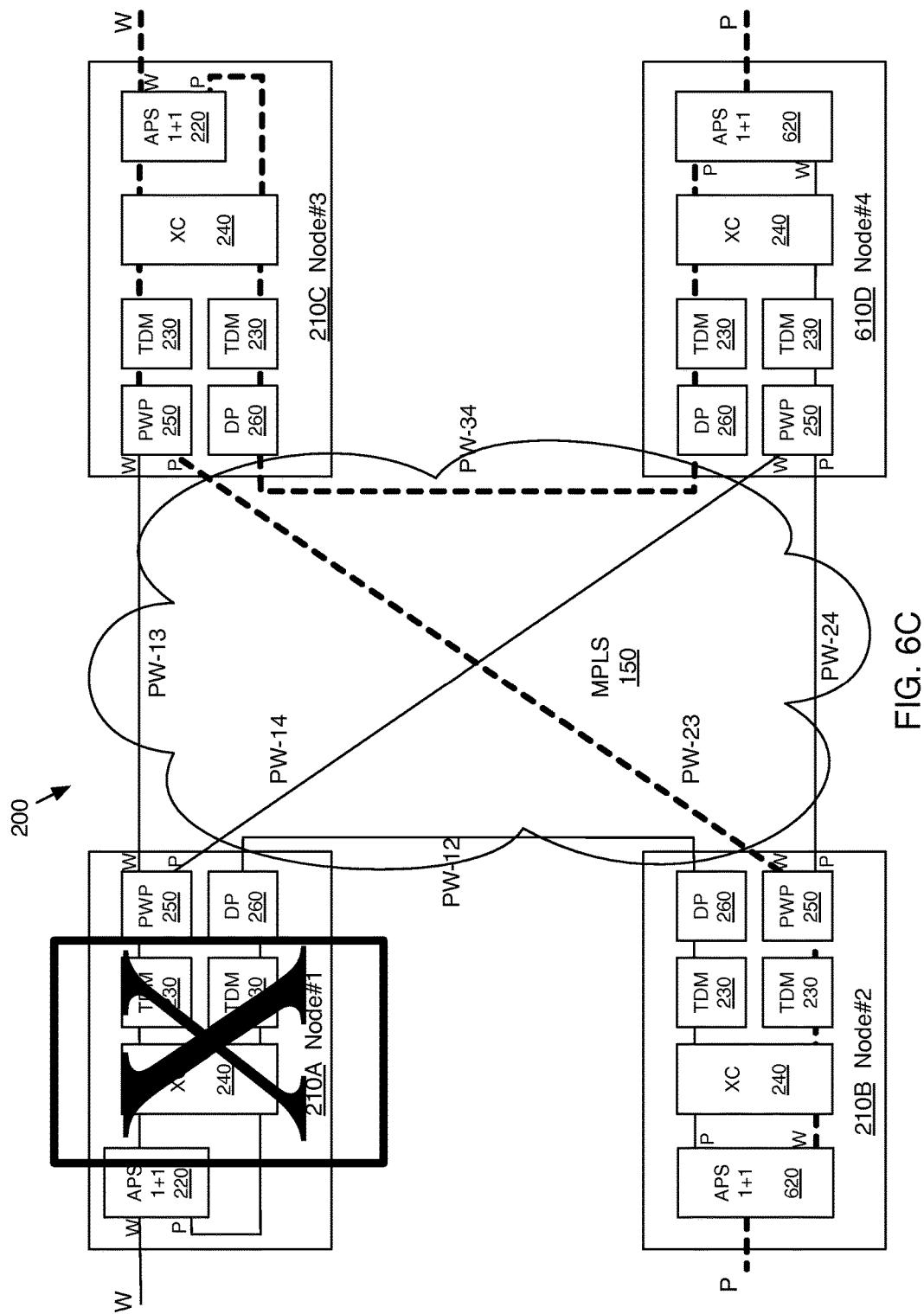
FIG. 6C is a schematic diagram of SDH paths in the fourth exemplary embodiment during a first failure scenario.

FIG. 6C shows the signal paths in the network 200 where the first node 210A has failed. In this case, the PWP block 250 in the third node 210C detects LOS or AIS on the first pseudo wire PW-13 and switches from the first pseudo wire PW-13 to the second pseudo wire PW-23. Under the fourth embodiment, the PW protection blocks 250 are revertive, without a wait-to-restore period, such that upon restoral of the first node 210A, the third node 210C will immediately revert to the first pseudo wire 13, as shown in FIG. 2B. Otherwise, in the right-to-left direction the path would not be transmitted over the first node 210A interface (working path), and in the left-to-right direction a failure in the protection path would not be resolved.

Figure 6D:
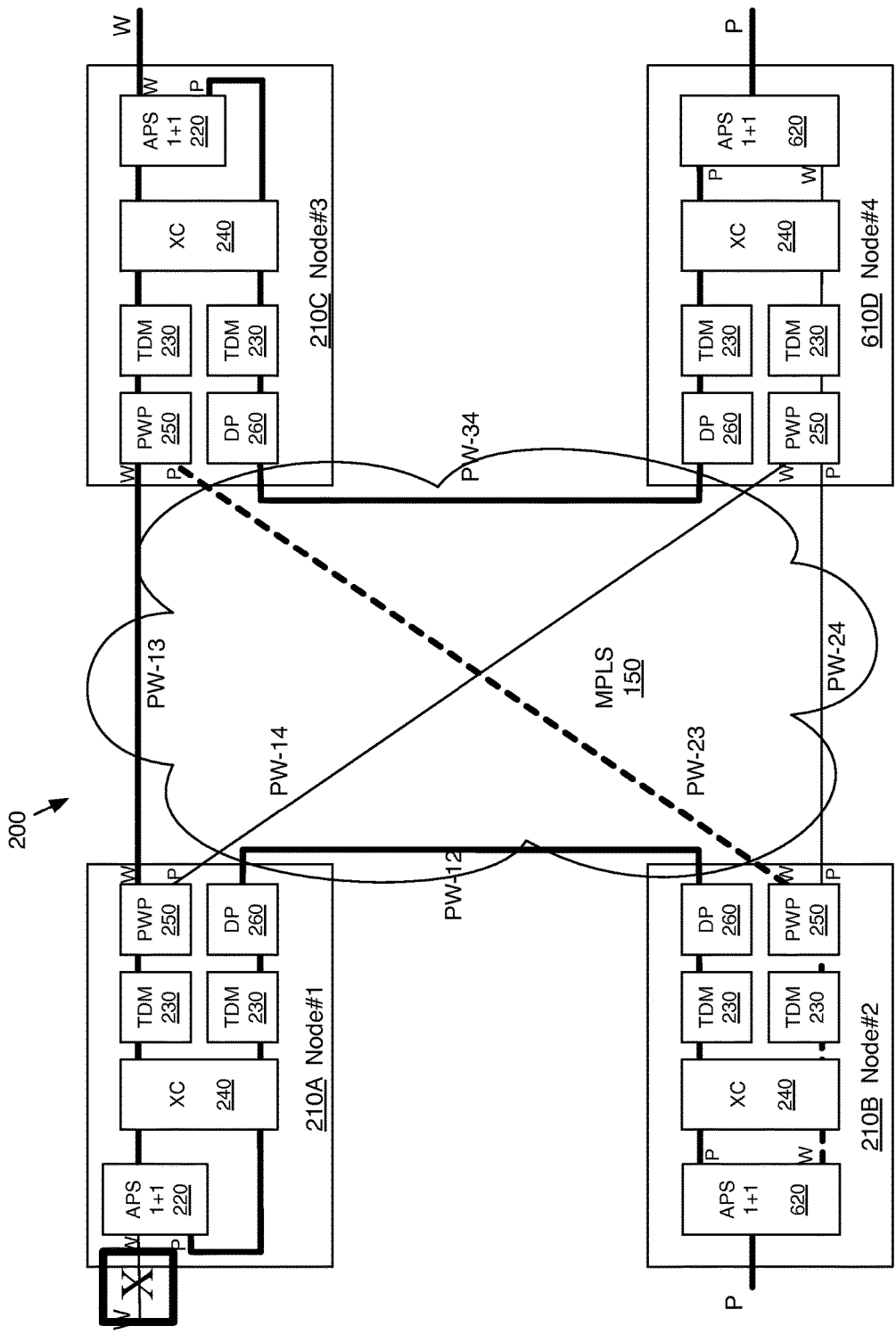
FIG. 6D is a schematic diagram of SDH paths in the fourth exemplary embodiment during a second failure scenario.

FIG. 6D shows the signal paths in the network 200 where the working path to the first node 210A has failed. In this scenario, the APS 1+1 block 220 in the first node 210A detects the failure at working port W and switches from the working path W to the protection path P received via the fifth pseudo wire PW-12 from the second node 210B. The first node 210A forwards this data path across the first pseudo wire PW-13 to the third node 210C, shown as a heavy solid line. The second node 210B forwards a protection data path to the third node 210C across the second pseudo wire PW-23, as shown by the heavy dashed line.

In some scenarios, the SDH path may be transmitted twice over the MPLS packet sub network 150, thereby causing bandwidth duplication. To avoid bandwidth duplication, the PW block functionality may be modified such that transmission over the PW is inhibited when the PW is not selected by the PWP block 250 in the far end. This state may be signaled by the PW protection block (250) using different mechanisms. As will be familiar to a person having ordinary skill in the art, the selected PW indication depends on the way the PW is signaled. For example, for an LDP-signaled PW, draft-muley-dutta-pwe3-redundancy-bit defines a "preferential forwarding bit" in the LDP PW status field for this purpose. For static PW, draft-martini-pwe3-static-pw-status extends the LDP PW status field for static PW (without LDP signaling). Other similar methods for signaling PW are within the scope of the present invention.

Figure 7:
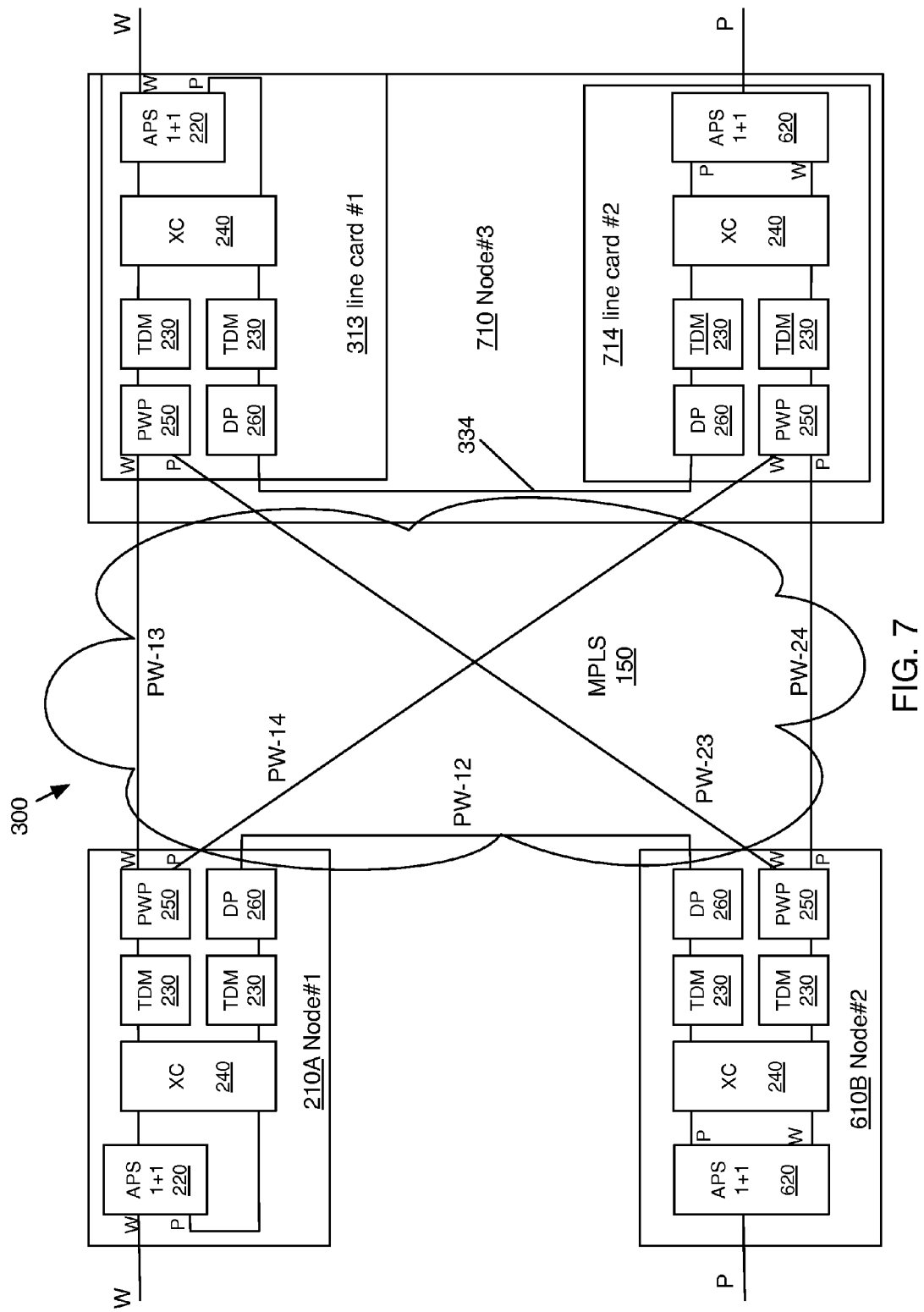
FIG. 7 is a schematic diagram of a non-DNI implementation of the fourth embodiment of a method of supporting SNCP over packet networks.

A variation of the fourth embodiment of a method of supporting SNCP over packet networks is shown in FIG. 7. Under this variation, the interconnection between the MPLS sub-network 150 with the first SDH sub-network and/or the second SDH sub-network may take place over a single node, as opposed to DNI.

FIG. 7 is a schematic diagram of the network 200 having three SNCP terminating nodes including a first node 210A, a second node 610B, and a third node 710. The first sub-network deploys a DNI connection with the MPLS sub-network 150. The first node 210A and the second node 610B are part of a first sub-network, and the third node 710 is part of a second sub-network. Unlike the fourth embodiment, under this variation the second sub-network provides two working/protection connection pairs to the MPLS sub-network at a single node, the third node 710.

FIG. 7 shows the first sub-network having a DNI connection, while the second sub-network terminates SNCP for dual working/protection pairs within a single node (in this case, a first line card 313 and a second line card 714 within the third node 710). However, there is no objection to a network where the first sub-network terminates dual working/protection pairs within a single node and the second sub-network terminates dual working/protection pairs within a single node. Note that the APS block in first line card 313 is the APS 1+1 block 220 and the APS block in the second line card 714 is an APS 1+1 block 620. The topology at each sub-network is independent of the topology of the sub-network at the other end. From the point of view of the MPLS sub-network 150, the variation of the fourth embodiment functions identically to the fourth embodiment.

In summary, a method for a packet sub-network connecting to two SDH sub-networks transporting SDH paths that are SNCP-protected has been presented. The packet sub-network may provide the same type of path protection as an SDH sub-network using SNCP. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for providing failure protection at the sub-network level in a network having a path traversing a plurality of sub-networks, such that a path failure in an individual sub-network is locally repaired and does not affect protection offered at another sub-network, the network comprising a first sub-network and a second sub-network, wherein the first sub-network and the second sub-network are in communication through a packet switched network, the method comprising the steps of:

configuring the first sub-network protocol from a group consisting of Synchronous Digital Hierarchy (SDH) and Synchronous Optical Network (SONET);

configuring path protection for the first sub-network from a group consisting of Sub-network Connection Protocol (SNCP) and Unidirectional Path Switched Ring (UPSR);

providing a first SNCP termination equipment (STE) in the first sub-network;

providing a second STE in the first sub-network;

configuring the first STE to terminate path protection from a first pseudo wire over the packet switched network between the first sub-network and the second sub-network;

configuring the second STE to terminate path protection from a second pseudo wire over the packet switched network between the first sub-network and the second sub-network;

configuring the second STE to terminate path protection from a third pseudo wire over the packet switched network between the first sub-network and the second sub-network;

configuring the first STE to terminate path protection from a fourth pseudo wire over the packet switched network between the first sub-network and the second sub-network; and configuring the first STE and the second STE such that the packet sub-network transports data plane traffic over exactly one path between the first sub-network and the second sub-network selected from the group of paths including the first pseudo wire, the second pseudo wire, the third pseudo wire, and the fourth pseudo wire.

2. The method of claim 1, wherein:

the first STE comprises a first automatic protection switch, wherein the first automatic protection switch further comprises an Automatic Protection Switch (APS) 1+1; and the second STE comprising a second automatic protection switch.

3. The method of claim 2, wherein the second automatic protection switch is selected from a group consisting of an APS 1:1 and an APS 1+1.

4. The method of claim 2, further comprising the step of configuring the second automatic protection switch outputs as the second pseudo wire and the third pseudo wire.

5. The method of claim 1, wherein the packet switched network is an Multiprotocol Label Switching (MPLS) network.

6. The method of claim 1, wherein the first sub-network comprises a first node and a second node, the first node further comprising the first STE and the second node further comprising the second STE.

7. The method of claim 6, wherein first node communicates with the second node through a first sub-network path through the packet switched network.

8. The method of claim 1, wherein the first sub-network comprises a first node, the first node further comprising the first STE and the second STE.

9. The method of claim 8, wherein first STE communicates with the second STE through a hairpin path within the first node.

10. A method for providing failure protection at the sub-network level in a network having a path traversing a plurality of sub-networks, such that a path failure in an individual sub-network is locally repaired and does not affect protection offered at another sub-network, the network comprising a first sub-network and a second sub-network, wherein the first sub-network and the second sub-network are in communication through a packet switched network, the method comprising the steps of:

selecting the first sub-network protocol from a group consisting of Synchronous Digital Hierarchy (SDH) and Synchronous Optical Network (SONET);

configuring path protection for the first sub-network from a group consisting of Sub-network Connection Protocol (SNCP) and Unidirectional Path Switched Ring (UPSR);

providing a first SNCP termination equipment (STE) in the first sub-network;
providing a second STE in the first sub-network;
configuring the first STE to terminate path protection from for a first pseudo wire over the packet switched network between the first sub-network and the second sub-network; and
configuring the second STE to terminate path protection from for a second pseudo wire over the packet switched network between the first sub-network and the second sub-network;
configuring the first STE and the second STE such that the packet sub-network transports data plane traffic over exactly one path between the first sub-network and the second sub-network selected from the group of paths including the first pseudo wire, and the second pseudo wire.

11. The method of claim 10, wherein:
the first STE comprises a first automatic protection switch, wherein the first automatic protection switch further comprises an Automatic Protection Switch (APS) 1+1; and
the second STE comprises a second automatic protection switch.

12. The method of claim 11, wherein the second automatic protection switch is selected from a group consisting of an APS 1:1 and an APS 1+1.

13. The method of claim 10, wherein the packet switched network is an Multiprotocol Label Switching (MPLS) network.

14. The method of claim 10, further comprising the step of configuring the second automatic protection switch outputs as the second pseudo wire and the third pseudo wire.

15. The method of claim 10, wherein the first sub-network comprises a first node and a second node, the first node further comprising the first STE and the second node further comprising the second STE.

16. The method of claim 15, wherein first node communicates with the second node through a first sub-network path through the packet switched network.

17. The method of claim 10, wherein the first sub-network comprises a first node, the first node further comprising the first STE and the second STE.

18. The method of claim 17, wherein first STE communicates with the second STE through a hairpin path within the first node.

* * * * *

UNITED STATES PATENT AND TRADEMARK OFFICE
CERTIFICATE OF CORRECTION

PATENT NO. : 9,735,864 B2  
APPLICATION NO. : 14/878405  
DATED : August 15, 2017  
INVENTOR(S) : Daniel Cohn et al.

Page 1 of 1

It is certified that error appears in the above-identified patent and that said Letters Patent is hereby corrected as shown below:

In Column 13, Line 5, Claim 10, delete the word "from";
In Column 13, Line 9, Claim 10, delete the word "from";
In Column 14, Line 9, Claim 14, instead of "the third pseudo"; should be -- a third pseudo --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*